United States Patent Office 3,408,309
Patented Oct. 29, 1968

3,408,309
Fe, Mo, Co, AND W MIXED OXIDES AS
OXIDATION CATALYSTS
Adolf W. Gessner, Montclair, N.J., assignor to The
Lummus Company, New York, N.Y., a corporation
of Delaware
No Drawing. Filed Nov. 16, 1964, Ser. No. 411,614
4 Claims. (Cl. 252—470)

ABSTRACT OF THE DISCLOSURE

This disclosure is particularly directed to the preparation of a catalyst for the oxidation of methanol to formaldehyde. An aqueous solution of an iron or cobalt salt having a pH of from 0.8 to 1.5 is added to an aqueous solution of a salt whose anion contains molybdenum or tungsten at a rate of about 1 to 5 liters/liter/minute to form a mixed oxide precipitate. The precipitate is filtered, washed and treated to a water content of from 55 to 62 percent by weight whereupon the precipitate is slowly dried at progressively increasing temperatures ranging from 70° to 325° F. until the water content is between 0.5 to 1.5 percent by weight. The dried precipitate is comminuted to a particle size of −4 to +10 mesh and calcined at a temperature of from 600° to 900° F. for 24 to 72 hours to form the catalyst.

---

This invention has to do with a process for preparing oxidation catalysts and, more specifically, for the production of oxide catalysts for converting alcohols, particularly methyl alcohol, to aldehydes, particularly formaldehyde.

For some years, ferric oxide-molybdenum trioxide catalysts have been known to be useful in the oxidation of methyl alcohol to formaldehyde. Such catalysts have been formed by a variety of processes, primarily by double decomposition of a water-soluble salt of a ferric halide and a water-soluble molybdate to precipitate an iron molybdate from aqueous solution. While the iron molybdate catalysts are effective for the production of formaldehyde in substantial yield, they suffer from several shortcomings. Some, for example, lack selectivity such that appreciable amounts of other oxidation products—including carbon monoxide—are formed. More importantly, however, iron molybdate catalysts known to date have limited physical strength as evidenced by attrition in reaction systems during use and as evidenced further by crumbling when stored or transported. A further disadvantage is relatively short catalyst life.

A feature of the present invention is the provision of an efficient process for preparing oxidation catalysts characterized by high physical strength, excellent selectivity and substantial catalyst life. Another feature is the provision of a process for preparing mixed oxide, oxidation catalysts effective in the conversion of an alcohol to an aldehyde. A more particular feature is the provision of a process for forming catalysts advantageous in the conversion of methyl alcohol to formaldehyde. Still another feature is the development of such a process for forming ferric oxide-molybdenum oxide catalysts. Other features of the invention will be apparent from the following description.

It has now been found that by employing a particular sequence in which several steps cooperate in some unexpected manner, excellent oxidation catalysts are formed. In accordance with the present invention, a mixed oxide catalyst active for the oxidation of an alcohol to an aldehyde is prepared by a process which comprises:

(a) adding an aqueous solution of a water-soluble metal salt of a metal (1) selected from the group consisting of iron and cobalt and having a pH between about 0.8 and about 1.5, to an aqueous solution of a water-soluble salt whose anion contains a metal (2) selected from the group consisting of molybdenum and tungsten, whereupon a mixture of oxides of metals (1) and (2) is formed and precipitates from the resulting reaction mixture;

(b) filtering the precipitate from said reaction mixture and washing the precipitate;

(c) removing water from the precipitate until its water content is between about 55 and about 62 percent by weight;

(d) kneading the precipitate;

(e) drying the kneaded precipitate for from about 5 to 7 days at progressively increasing temperatures starting at about 70° F. and concluding at about 325° F. until the water content thereof is from about 0.5 to about 1.5 percent by weight;

(f) comminuting the precipitate from (e) and recovering material having a particle size passing through −4 to +10 mesh; and (g) calcining the −4 to +10 mesh material from (f) at a temperature from about 700° F. to about 850° F. for from about 24 to about 72 hours until the resulting catalyst is substantially anhydrous, as evidenced by no further weight loss on prolonged calcining.

Particularly desirable catalysts are obtained in the new process by adding the aqueous solution of a salt of metal (1) slowly to the aqueous solution of a salt of metal (2) at an approximate rate of 1–5 litres/minute with vigorous agitation.

In the preparation of the preferred iron molybdate catalysts of this invention, the process comprises:

(a) adding an aqueous ferric iron solution having a pH between 0.8 and 1.5 to an aqueous solution of a soluble molybdate having a pH above 5.0 and up to about 5.3, whereupon an iron molybdate is formed and precipitates from the resulting reaction mixture;

(b) filtering the precipitate from said reaction mixture and washing the precipitate;

(c) removing water from the precipitate until its water content is between 55 and 62 percent by weight;

(d) kneading the precipitate;

(e) drying the kneaded precipitate for about seven days at progressively increasing temperature starting at about 70° F. and concluding at about 280° F. until the moisture content thereof is about 1.5 percent by weight;

(f) comminuting the precipitate from (e) and recovering material having a particle size passing through −4 to +10 mesh; and (g) calcining the −4 to +10 mesh material from (f) at a temperature from about 700° F. to about 850° F. for about 48 hours until the resulting catalyst is substantially anhydrous. Here again, further advantage is realized by adding an aqueous ferric chloride solution slowly to an aqueous ammonium heptamolybdate solution at a rate of from about 1 to about 5 litres/litre/minute.

The invention is described in detail hereinbelow in terms of the preparation of preferred iron molybdate catalysts. However, it is to be understood, as indicated later, that other mixed oxide catalysts are also contemplated herein.

In the formation of an iron molybdate, an aqueous solution of a water-soluble metal salt of iron is used; preferred is ferric chloride. Other iron salts such as bromides, nitrates, sulfates, acetates, oxalates and the like are suitable. Concentration of iron salt in the solution should be from about 1 to about 5 percent by weight, particularly about 1.2 percent. An important feature is that the pH of the iron solution should be of the approximate range 0.8–1.5, and particularly 1.0–1.4. The pH of the solution can be adjusted by adding thereto a strong acid such as a halogen acid. Hydrochloric acid is advantageous in this regard. The temperature is maintained at about 70–100° F. during the formation of the iron molybdate.

A water-soluble molybdate salt is used in forming the iron molybdate catalysts. Typical of such salts are ammonium, potassium and sodium molybdates. Preferred herein is ammonium heptamolybdate. Here, too, concentration is of importance and should be of the order of about 5 to about 10 percent by weight, advantageously about 6.5 percent. A salient feature of the process is the pH range of the aqueous molybdate solution; this is greater than 5.0 and less than 5.5, preferably about 5.3.

The aqueous solution of ferric chloride, adjusted to suitable pH value with HCl, is added to the aqueous solution of ammonium heptamolybdate, with vigorous stirring of the latter solution and of the resulting reaction mixture. Here, too, it is essential that a control be maintained, namely, control of the rate at which the ferric chloride solution is added. Addition of the ferric chloride solution should be relatively slow, at a rate of from about 1 to about 5 litres/litre/minute. When the addition is made more rapidly, the resulting iron molybdate precipitate settles slowly and is difficult to filter. Catalysts ultimately formed from such a precipitate are crumbly. In contrast, when the addition is made in accordance with the rate given above, the resulting precipitate settles rapidly and filters easily, and the catalyst formed therefrom is physically strong.

It has also been found that a ferric chloride solution and strong HCl can be added individually and simultaneously to the ammonium heptamolybdate solution, for the formation of desired catalysts. In such instance, it is necessary to maintain the concentrations, pH values and rate of addition specified above.

The weight ratio of Fe/Mo, in the formation of an iron molybdate, should be from about 1/3.5 to about 1/6.1, and preferably about 1/5.

Following formation of the iron molybdate precipitate, it is filtered from the reaction mixture. The precipitate is then washed with water to remove any soluble salts. Generally, it is recommended that it be washed until the pH of the clear supernatant liquid is 2.9–3.0.

Water is then removed from the precipitate, which contains up to about 80 percent by weight thereof, to provide a mass having a water content of the approximate range of 55 to 62 percent by weight, and preferably 55–58 percent by weight. Water can be removed from the precipitate by pressure filtration in order to compact the precipitate. Water can also be removed by using a centrifuge and by partial drying. When the water content of the precipitate is above about 60, and particularly above about 62 percent by weight, the subsequent kneading operation has been found to be ineffective with the result that the final catalyst composition has poor physical strength. And, when the water content of the precipitate is below about 55, and particularly below about 50, percent by weight, poor products are obtained.

As indicated, when the precipitate is of the proper water content recited above, it is then kneaded. This can be accomplished with a sigma-arm kneader, such as one manufactured by Baker-Perkins. The kneading action serves to provide a homogeneous mass, and to compact the filter cake. Generally, the kneading operation is conducted for from about 15 to about 120 minutes. Kneading of the precipitate cooperates with one or more of the other steps of the process to provide desired catalysts of high physical strength.

The kneaded precipitate is now dried to a water content ranging from about 0.5 to about 1.5 percent by weight. Again, control is exercised in that drying is conducted over a period of 5–7 days with temperatures of the kneaded precipitate initially about 70° F. and finally at about 325° F., and preferably 70–280° F. Initially, drying is at a sufficiently slow rate that the formation of cracks in the filter cake as it shrinks is minimized. A suitable drying rate is from about 0.1 gram/hour/square centimeter of exposed surface, initially, to virtually zero toward the end of the drying cycle. Drying can be carried out in an oven or in a drier with heated air passed over the kneaded mass.

The dried precipitate is then comminuted to fine particle size, as by crushing or grinding in suitable equipment and passing the resulting comminuted particles through a screen or screens. Advantageously, the particles used in forming the desired catalysts have a mech size (U.S. standard) from −3 to +12, preferably −4 to +10.

Comminuted particles of suitable size are calcined at a temperature of the approximate range 600° F. to 900° F., preferably 700–850° F., for an interval of 24 to 72 hours, and preferably about 48 hours. The calcined product is substantially anhydrous, containing from 0 to about 0.5 percent by weight of water. Here also, the calcining step serves to enhance the physical strength of the catalysts. Thus, the catalysts are suitable for transport and storage with little or no formation of fines. The catalysts have a Fe/Mo weight ratio from about 1/3.5 to about 1/6.1, preferably 1/4.8 to 1/5.2.

Examples 1 and 2 following are provided to illustrate the invention and are not introduced with the intention of unduly limiting the generally broad scope of the invention. Example 3 is provided to contrast other related catalysts with those formed in accordance with the process of this invention.

EXAMPLE 1

A 1.2 weight percent aqueous solution of $FeCl_3$ acidified with strong HCl to a pH of 0.8–1.0, was added to a 6.4 weight percent aqueous solution of ammonium heptamolybdate under vigorous stirring in the ratio of 5:1 by weight of Mo to Fe. The resulting precipitate was washed and filtered. The filter cake was compacted by pressure filtration until its moisture content was 55–58 percent by weight, and kneaded in a sigma-arm kneader. The kneaded material was dried for one week at a progressively increasing temperature ranging from room temperature to 280° F. After one week's drying, the moisture content of the material was 1.5 percent. This material was crushed and screened, and the −4 to +10 mesh material was calcined at 750–850° F. for two days. This catalyst was then placed in a ¾" 16BWG tube and a stream of air containing 8.5–9.5 volume percent of methanol was passed over it for over 5,000 hours at space velocities from 7,000 to 8,000 hours at temperatures from 520–560° F. The molar yield of formaldehyde from methanol ranged from 91 to 94 percent, and the catalyst hot spot from 620 to 650° F. The pressure drop across a 20 inch deep catalyst bed never exceeded 3 pounds per square inch (p.s.i.).

EXAMPLE 2

A catalyst was prepared as described in Example 1, except that in the precipitation step, aqueous $FeCl_3$ solution and strong hydrochloric acid were added to the aqueous ammonium heptamolybdate solution simultaneously from two separate sources. The characteristics of this catalyst were identical to those of the catalyst described in Example 1.

EXAMPLE 3

Several catalysts were prepared as described in Example 1 except that, in the precipitation step, the aqueous ammonium heptamolybdate solution was added to the aqueous ferric chloride solution. These catalysts were found to be less reactive than those described in Examples 1 and 2, in that temperatures from 605–700° F. were required to bring about a high conversion of methanol. These catalysts were also less selective than the catalysts described in Examples 1 and 2, giving yields ranging from only 85–91 percent. They were found to be more susceptible to physical attrition, as evidenced by a progressive increase in reactor pressure drop to 10 p.s.i. in periods of continuous operation ranging from two days to a week.

Although the invention has been illustrated in detail in terms of the preparation of iron molybdate catalysts, it is to be understood that other oxidation catalysts can be formed by resorting to the new process. Mixed oxide catalysts can be formed from water-soluble metal salts of cobalt in place of, or together with, similar salts of iron, and water-soluble metal salts of tungsten in place of, or together with, similar salts of molybdenum.

The language "iron molybdate" has been used herein in a generally descriptive sense, since the precise composition of the precipitate formed from ferric chloride and ammonium heptamolybdate, and the composition of the ultimate catalyst formed therefrom, are not known. Thus, the catalysts are broadly defined as mixed oxides, typical of which is one comprised of iron oxide or oxides and molybdenum oxide or oxides.

As shown, the catalysts of this invention are advantageous for oxidizing methyl alcohol to formaldehyde. They can also be used for corresponding oxidation of ethyl and higher alcohols to aldehydes.

The catalysts can be used by themselves—i.e., in unsupported form—and can also be used when supported on a suitable material such as Carborundum.

Obviously many modifications and variations of the invention as set forth above may be made without departing from the spirit and scope thereof; consequently, the appended claims are intended to include such modifications and variations.

I claim:
1. A process for preparing a molybdenum oxide-iron oxide catalyst active for the catalytic oxidation of methyl alcohol to formaldehyde, which comprises:
  (a) adding an aqueous ferric iron solution having a pH between 0.8 and 1.5 to an aqueous solution of a soluble molybdate having a pH above 5.0 and up to about 5.3, whereupon an iron molybdate is formed and precipitates from the resulting reaction mixture;
  (b) filtering the precipitate from said reaction mixture and washing the precipitate;
  (c) removing water from the precipitate until its water content is between 55 and 58 percent by weight;
  (d) kneading the precipitate;
  (e) drying the kneaded precipitate for about seven days at progressively increasing temperature starting at about 70° F. and concluding at about 280° F. until the moisture content thereof is about 1.5 percent by weight;
  (f) comminuting the precipitate from (e) and recovering material having a particle size passing through −4 to +10 mesh; and
  (g) calcining the −4 to +10 mesh material from (f) at a temperature from about 700° F. to about 850° F. for about 48 hours until the water content of the resulting catalyst is about 0–0.5 percent by weight.

2. The process defined by claim 1 wherein the ferric iron solution is ferric chloride.

3. The process defined by claim 1 wherein the molybdate is ammonium heptamolybdate.

4. The process defined by claim 1 wherein an aqueous solution of ferric chloride is added slowly to an aqueous solution of ammonium heptamolybdate at a rate from about 1 to about 5 litres/minute.

References Cited

UNITED STATES PATENTS

| | | | |
|---|---|---|---|
| 2,812,309 | 11/1957 | Allyn et al. | 252—470 |
| 3,152,997 | 10/1964 | Natta et al. | 252—470 |
| 2,812,310 | 11/1957 | Walker et al. | 252—470 |

FOREIGN PATENTS

| | | |
|---|---|---|
| 938,648 | 10/1963 | Great Britain. |
| 1,310,499 | 10/1962 | France. |

DANIEL E. WYMAN, *Primary Examiner.*

P. E. KONOPKA, *Assistant Examiner.*